US012801481B2

(12) United States Patent
Makkadayil et al.

(10) Patent No.: US 12,801,481 B2
(45) Date of Patent: Nov. 17, 2026

(54) CHECKSUM-BASED FAULT DETECTION AND CORRECTION FOR A MATRIX COMPUTE ENGINE

(71) Applicant: Intel Corporation, Santa Clara, CA (US)

(72) Inventors: Srajudheen Makkadayil, Bangalore (IN); Jaijith K Radhakrishnan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/993,675

(22) Filed: Nov. 23, 2022

(65) Prior Publication Data

US 2024/0168841 A1 May 23, 2024

(51) Int. Cl.
*G06F 11/07* (2006.01)
*G06F 17/16* (2006.01)

(52) U.S. Cl.
CPC ...... *G06F 11/0793* (2013.01); *G06F 11/0721* (2013.01); *G06F 17/16* (2013.01)

(58) Field of Classification Search
CPC ... G06F 11/0721; G06F 11/0793; G06F 17/16
See application file for complete search history.

(56) References Cited

U.S. PATENT DOCUMENTS 11,507,452 B1 * 11/2022 Yoon .................. G06F 15/8046
2020/0074287 A1 * 3/2020 Mody .................... G06N 3/063
2023/0108629 A1 * 4/2023 Liu ....................... G06F 7/5443 708/200

OTHER PUBLICATIONS

Shi et al., "Grid-Like Error-Correcting Codes for Matrix Multiplication with Better Correcting Capability," 2025 IEEE Information Theory Workshop (ITW), Sydney, Australia, 2025, pp. 608-613. (Year: 2025).*

Zhu et al., "Block-Checksum-Based Fault Tolerance for Matrix Multiplication on Large-Scale Parallel Systems," 2018 IEEE 20th International Conference on High Performance Computing and Communications; pp. 172-179 (Year: 2018).*

Lahari et al., "Systolic Array based Multiply Accumulation Unit for IoT Edge Accelerators," 2021 IEEE International Symposium on Smart Electronic Systems (iSES), Jaipur, India, 2021, pp. 220-223 (Year: 2021).*

Abraham, Jacob A., et al. "Fault tolerance techniques for systolic arrays." Computer;(United States) 20.7 (1987). (Year: 1987).*

* cited by examiner

*Primary Examiner* — Michael Maskulinski
(74) *Attorney, Agent, or Firm* — Essential Patents Group, LLP

(57) ABSTRACT

An example of an apparatus may include matrix operation hardware and circuitry coupled to the matrix operation hardware to detect a hardware fault in the matrix operation hardware based at least in part on one or more hardware checksums of data in one or more matrices of the matrix operation hardware. Other embodiments are disclosed and claimed.

14 Claims, 14 Drawing Sheets

$$WCS\,[k] = \sum_{j=1}^{n} W[k,j]$$

$$XRS\,[k] = \sum_{i=1}^{m} X[i,k]$$

CHECKSUM-BASED FAULT DETECTION AND CORRECTION FOR A MATRIX COMPUTE ENGINE

BACKGROUND

Safety-critical electronics may utilize redundancy to ensure safe system operation. If a discrepancy occurs between two redundant circuits, there may be a fault in the system and the system may immediately move to a safe state. There is an ongoing need for improved computational devices to enable ever increasing demand for modeling complex systems, providing reduced computation times, and other considerations. In particular, there is an ongoing desire to improve fault detection circuits that are included in or otherwise support operation of integrated circuits. It is with respect to these and other considerations that the present improvements have been needed. Such improvements may become critical as the desire to improve computational efficiency become even more widespread.

BRIEF DESCRIPTION OF DRAWINGS

Various examples in accordance with the present disclosure will be described with reference to the drawings, in which.

DETAILED DESCRIPTION

Figure 1:
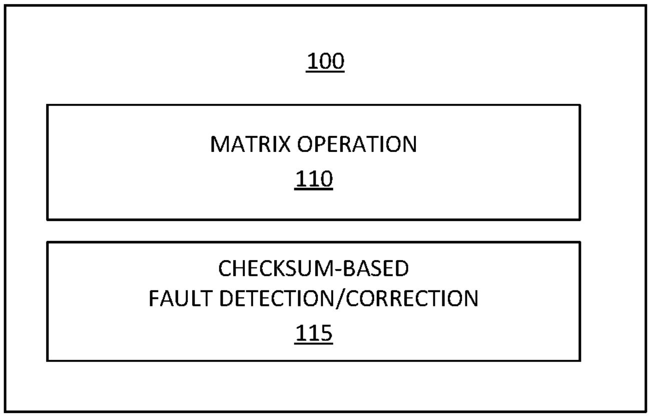
FIG. 1 is a block diagram of an example of an integrated circuit in one implementation.

The present disclosure relates to methods, apparatus, systems, and non-transitory computer-readable storage media for checksum-based fault detection and correction for matrix operations. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to detect and correct faults in hardware matrix operation circuitry based on hardware checksum operations. Some examples may be particularly beneficial for parallel computing applications, a graphics processor unit (GPU) (e.g., as part of a discrete graphics card), a single-instruction multiple-data (SIMD) processor, an artificial intelligence (AI) processor, machine learning (ML) applications, and neural network processing applications. Some examples may provide technology for automotive specific applications including autonomous driving (AD), automated driver assistance systems (ADAS), rendering, and/or sensor/image processing.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Hardware matrix compute engines are widely used across many safety-critical domains such as autonomous driving cars and advanced driver assistance systems (ADAS). One problem in such safety-critical applications is providing a suitable safety and/or reliability certification for such artificial intelligence (AI) components (e.g., with respect to International Organization for Standardization (ISO) 26262, titled "Road vehicles—Functional safety," an international standard for functional safety of electrical and/or electronic systems that are installed in serial production road vehicles). Such certification may involve evidence of efficient protection against hardware faults of the underlying platform, including transient soft errors and permanent faults. With integrated circuit technology scaling to smaller sizes and larger memory density per area, complex platforms may be even more susceptible to both transient and permanent faults. Even though integrated circuits are thoroughly tested before being placed in service, degradation over a long lifetime may lead to subsequent permanent faults (e.g., especially in automotive products that may have a fifteen year or longer expected lifetime).

For safer operation, and as recommended by some safety standards, measures may be deployed to detect and control transient and/or permanent faults in such a way that the faults do not lead to failure of the complete system. Some systems may use high degrees of redundancy in compute to improve fault tolerance. For example, hardware redundancy-based fault detection may involve replicating the hardware and comparing the outputs of the replicated modules. A problem is that such hardware redundancy is costly in many ways including expense, circuit area, power consumption, etc. Some systems may implement various forms of software-based fault-tolerance. A problem is that such software implementations may not be suitably efficient for power and performance. For example, software implementations may have high latency that is not suitable for latency critical applications such as autonomous driving. Another problem is that software implementations may reuse the same hardware for a redundant compute operation and accordingly a common fault may occur in the reused hardware that is not detected.

Some examples described herein overcome one or more of the foregoing problems. Some examples provide technology to detect and correct faults on matrix-matrix multiplication based on checksums, which avoids redundancy completely. Some examples provide technology for checksum-based fault detection and correction, without hardware redundancy, for a matrix compute engine. For example, some implementations may be suitable to detect and correct faults for matrices of convolutional neural network (CNN) technology, such as systolic arrays.

In some examples, a matrix computation hardware engine may be enhanced with a fault detection mechanism without redundancy overhead. Some examples may compute/perform input checksums, output checksums, checksum multiplications and checksum comparisons. In some examples, all or various matrix compute operations and checksum operations may be executed in parallel without additional data fetch from memory (e.g., and without additional latency). In some example, the checksum-based hardware circuitry may be configured to detect and locate faults. In some example, the checksum-based hardware circuitry may be further configured to generate metadata of the fault location. In some examples, the generated metadata may be utilized to correct errors. For example, a suitably configured system may utilize the fault location information along with other data integrity checks (e.g., such as error correction codes (ECCs)) to detect and correct a wide variety of random/transient faults as well as lifetime degradation/permanent fault.

Advantageously, as compared to hardware redundancy-based technology (e.g., where the fault location in a particular matrix cannot be identified), some examples may provide fault detection and fault location identification in hardware with no additional latency. As compared to hardware redundancy-based technology, some examples advantageously may utilize substantially less integrated circuit area, which corresponding improvements in cost and power utilization. As compared to hardware redundancy-based technology (e.g., where a current safety critical operation is stopped after a fault is detected and the system is moved to a safe state), some examples advantageously may provide sufficiently low latency for detection and correction of faults (e.g., within a fault detection time threshold) such that a safety critical operation may continue without putting the system in a safe state. Further advantageously, as compared to software implementations (e.g., where data is re-fetched from memory again for redundant compute), some examples may re-use the same data for checksum compute and the matrix operation (e.g., with substantially less impact on power and memory bandwidth for the same performance). Some examples may also provide improved reliability and yield due to fault detection and correction.

With reference to FIG. 1, an example of an integrated circuit 100 may include matrix operation hardware circuitry 110, and checksum-based hardware circuitry 115 coupled to the matrix operation hardware circuitry 110 to detect a hardware fault in the matrix operation hardware circuitry 110 based at least in part on one or more hardware checksums of data in one or more matrices of the matrix operation hardware circuitry 110. In some examples, the circuitry 115 may be further configured to correct the detected hardware fault based at least in part on the one or more hardware checksums. For example, the circuitry 115 may also be configured to continue a safety critical operation without interruption after the hardware fault is detected and corrected.

In some examples, the circuitry 115 may be further configured to determine a location of a detected hardware fault in a matrix of the one or more matrices of the matrix operation hardware circuitry based at least in part on the one or more hardware checksums. For example, the circuitry 115 may also be configured to generate metadata that indicates the determined location of the detected hardware fault, and to correct the detected hardware fault based at least in part on the generated metadata and the one or more hardware checksums. The circuitry 115 may also be configured to continue a safety critical operation without interruption after the hardware fault is detected and corrected.

In some examples, the circuitry 115 may be further configured to compute a checksum in parallel with a matrix multiplication operation of the matrix operation hardware circuitry. For example, the circuitry 115 may also be configured to perform a checksum computation and a matrix multiplication on a same operand at a same data location in a matrix of the one or more matrices of the matrix operation hardware circuitry.

In some examples, the circuitry 115 may be further configured to compute two input checksums, a checksum multiplication of the two input checksums, and an output checksum in parallel with a matrix multiplication operation of the matrix operation hardware circuitry. For example, the circuitry 115 may also be configured to detect the hardware fault in the matrix operation hardware circuitry based at least in part on a comparison of respective results of the checksum multiplication and the output checksum. The circuitry 115 may be further configured to include one or more aspects of any of the other examples described herein.

Figure 15:
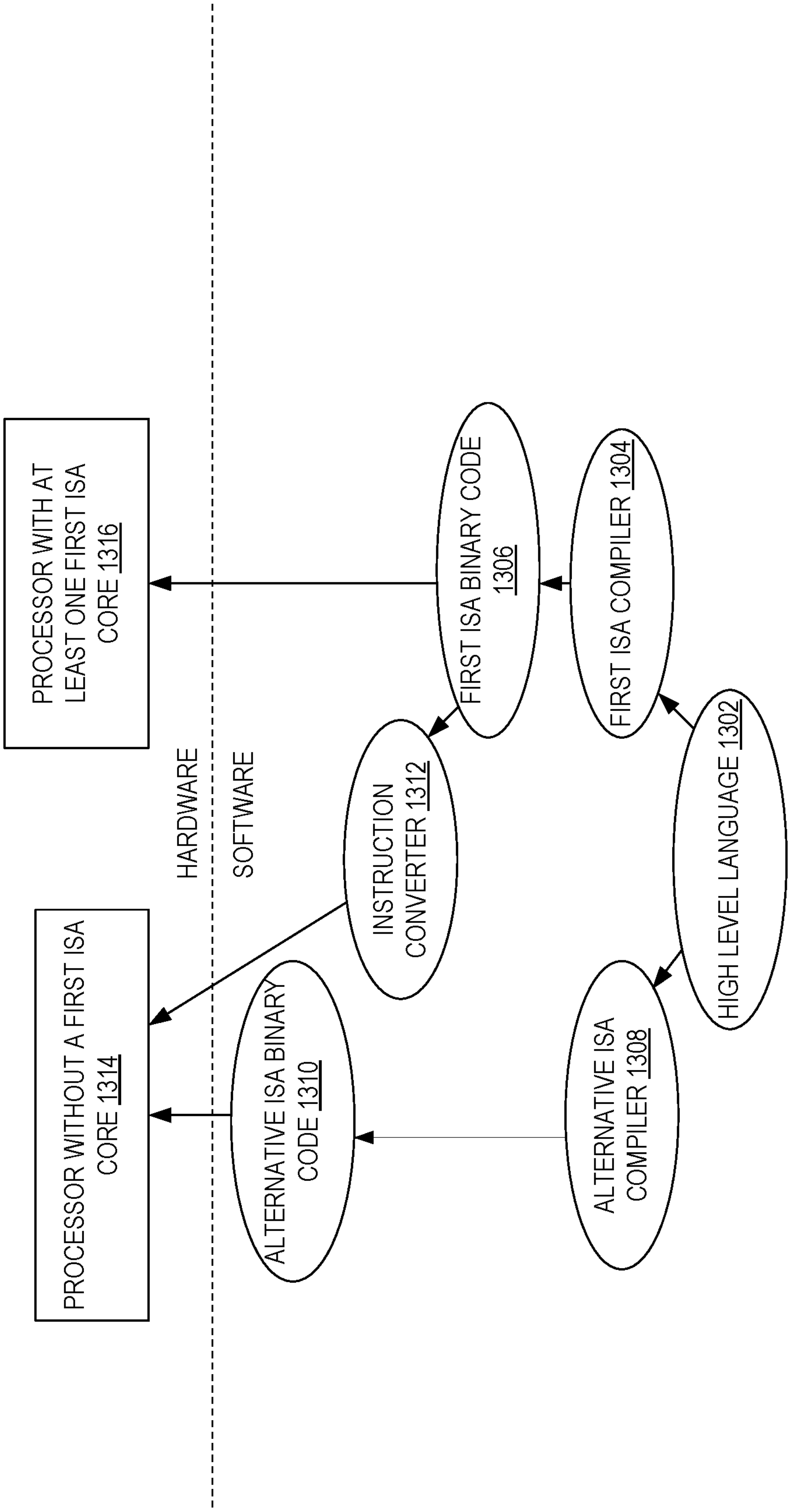
FIG. 15 is a block diagram illustrating the use of a software instruction converter to convert binary instructions in a source instruction set architecture to binary instructions in a target instruction set architecture according to examples.

For example, the circuitry 110 and/or the circuitry 115 may be integrated/incorporated with/in any of the processors described herein. In particular, the circuitry 110 and/or the circuitry 115 may be integrated/incorporated with/in the processor 800, the processor 870, the processor 815, the coprocessor 838, and/or the processor/coprocessor 880 (FIG. 10), the processor 900 (FIG. 11), the core 1090 (FIG. 12B), the execution units 1062 (FIGS. 12B and 13), and the processor 1316 (FIG. 15). Some examples of the circuitry 110 and/or the circuitry 115 may be integrated/incorporated with/in a parallel computing application, a GPU, a SIMD processor, and/or an AI processor.

Figure 2:
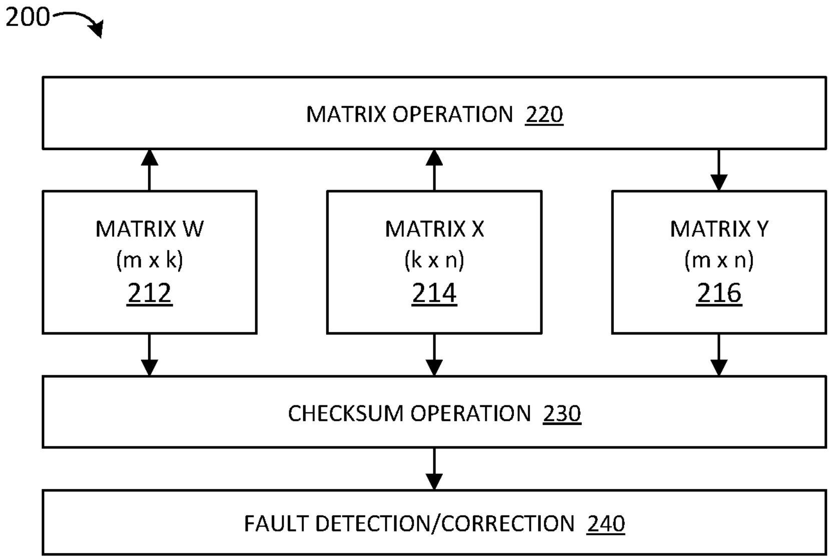
FIG. 2 is a block diagram of an example of an apparatus in one implementation.

With reference to FIG. 2, an example of an apparatus 200 includes circuitry 212 to store a machine representation of data for a matrix W with dimensions of m by k, where m and k are both positive integer values, circuitry 214 to store a machine representation of data for a matrix X with dimensions of k by n, where n is a positive integer value, and circuitry 216 to store a machine representation of data for a matrix Y with dimensions of m by n. The apparatus 200 further includes circuitry 220 to perform a matrix operation on the matrix W and the matrix X and to store a result of the matrix operation in the matrix Y, circuitry 230 to perform one or more checksum operations on one or more of the matrix W, the matrix X, and the matrix Y, and circuitry 240 to detect a hardware fault in the circuitry based at least in part on a result of the one or more checksum operations.

In some examples, the circuitry 230 may be configured to perform a column-wise checksum of the data for the matrix W, to perform a row-wise checksum of the data for the matrix X, to perform a column-wise checksum of the data for the matrix Y, and to perform a row-wise checksum of the data for the matrix Y. For example, the circuitry 240 may be configured to detect the hardware fault based at least in part on whether a product of the column-wise checksum of the data for the matrix W and a data value in the matrix X is equal to a corresponding value of the column-wise checksum of the data for the matrix Y. Additionally, or alternatively, the circuitry 240 may be configured to detect the hardware fault based at least in part on whether a product of the row-wise checksum of the data for the matrix X and a data value in the matrix W is equal to a corresponding value of the row-wise checksum of the data for the matrix Y. Additionally, or alternatively, the circuitry 240 may be configured to detect the hardware fault based at least in part on whether a product of the column-wise checksum of the data for the matrix W and the row-wise checksum of the data for the matrix X is equal to a sum of the row-wise checksum and the column-wise checksum of the data for the matrix Y.

In some examples, the circuitry 240 may be further configured to determine a location of a fault in the matrix Y based on respective positions of failed comparisons for the row-wise checksum and the column-wise checksum of the data for the matrix Y. The determined location information may be used to detect at field (on use) circuit failures for a reliability study of the process. In some examples, the circuitry 230 may be configured to re-use a same data location in the matrix W for both the matrix operation and the column-wise checksum operation for the matrix W. Additionally, or alternatively, the circuitry 230 may be configured to re-use a same data location in the matrix X for both the matrix operation and the row-wise checksum operation for the matrix X. Any of the circuitry 212, 214, 216, 220, 230, 240 may be further configured to include one or more aspects of any of the other examples described herein.

For example, the apparatus 200 may be integrated/incorporated with/in any of the processors described herein. In particular, any/all of the circuitry 212, 214, 216, 220, 230, 240 may be integrated/incorporated with/in the processor 800, the processor 870, the processor 815, the coprocessor 838, and/or the processor/coprocessor 880 (FIG. 10), the processor 900 (FIG. 11), the core 1090 (FIG. 12B), the execution units 1062 (FIGS. 12B and 13), and the processor 1316 (FIG. 15). Some examples of any/all of the circuitry 212, 214, 216, 220, 230, 240 may be integrated/incorporated with/in a parallel computing application, a GPU, a SIMD processor, and/or an AI processor.

Figure 3:
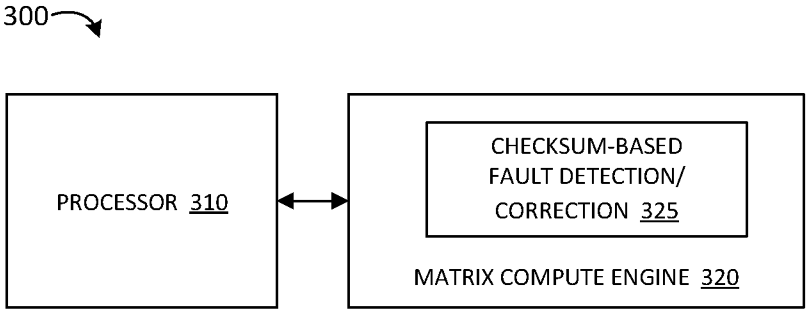
FIG. 3 is a block diagram of another example of an apparatus in one implementation.

With reference to FIG. 3, an example of an apparatus 300 includes a processor 310 and a matrix compute engine 320 communicatively coupled to the processor 310. The matrix compute engine 320 may be configured to perform a matrix operation on a first input matrix and a second input matrix and store respective results of the matrix operation in an output matrix. The matrix compute engine 320 includes checksum-based fault detection/correction circuitry 325 to perform respective checksum operations on one or more row and columns of the first input matrix, the second input matrix, and the output matrix, and detect a hardware fault in the matrix compute engine 320 based at least in part on respective results of the respective checksum operations. In some examples, the matrix compute engine 320 may be configured to flatten and rearrange weights and input features of a three-dimensional convolution to map the three-dimensional convolution to multiple matrix multiplication operations.

In some examples, the circuitry 325 may be further configured to correct the detected hardware fault based at least in part on respective comparisons of the respective results of the respective checksum operations, and to continue a safety critical operation without interruption after the hardware fault is detected and corrected. In some examples, the circuitry 325 may be further configured to determine a location of a detected hardware fault in one or more of the first input matrix, the second input matrix, and the output matrix based at least in part on respective comparisons of the respective results of the respective checksum operations. In some examples, metadata generates by the matrix compute engine 320 may be utilized by software executed by the processor 310 to correct errors. The circuitry 325 may also be configured to perform one or more of the respective checksum operations in parallel with the matrix operation.

In some examples, the circuitry 325 may be further configured to perform first checksum operations on each column of the first input matrix and store respective results of the first checksum operations in an input checksum row vector, perform second checksum operations on each row the second input matrix and store respective results of the second checksum operations in an input checksum column vector, perform third checksum operations on each column of the output matrix and store respective results of the third checksum operations in an output checksum row vector, and perform fourth checksum operations on each row the output matrix and store respective results of the fourth checksum operations in an output checksum column vector. The circuitry 325 may be further configured to include one or more aspects of any of the other examples described herein.

For example, the processor 310 may be implemented as any of the processors described herein. In particular, the processor 310 may be implemented as the processor 800, the processor 870, the processor 815, the coprocessor 838, and/or the processor/coprocessor 880 (FIG. 10), the processor 900 (FIG. 11), the core 1090 (FIG. 12B), the execution units 1062 (FIGS. 12B and 13), and the processor 1316 (FIG. 15). Some examples of the processor 310 may be implemented as a GPU, a SIMD processor, an AI processor, and/or as part of a parallel computing application.

FIGS. 4A to 4F shows examples of matrix structures and equations for checksum-based fault detection and correction. In these examples, checksum-based technology may be utilized to provide fault tolerance on regular matrix multiplication. For example, the checksum-based fault tolerance technology may be utilized to detect and correct errors caused by transient and/or random faults and/or lifetime degradation faults.

Figures 4A, 4B, 4C:
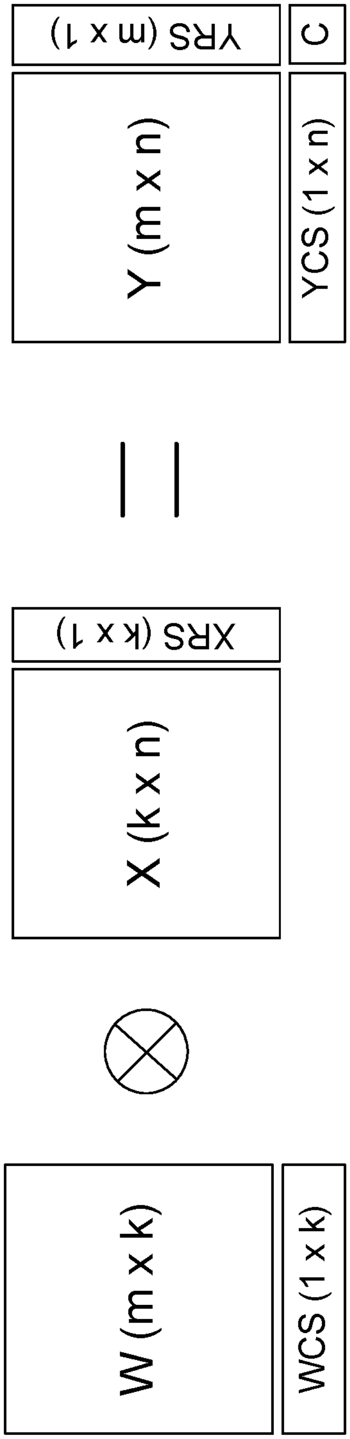
FIGS. 4A to 4F show illustrative examples of matrix structures and equations for checksum-based fault detection and correction in accordance with some implementations.

FIG. 4A shows two input matrices W and X. The matrix W has dimensions of m×k and the matrix X has dimensions of k×n. Another matrix Y is an output matrix of dimensions m×n. A column checksum WCS is a row vector where each column of the W matrix is added. XRS is a column vector where each row of the X matrix is added. YCS is a row vector where each column is added from the output Y matrix and YRS is a column vector where each row of the output Y matrix is added.

Figure 4D:
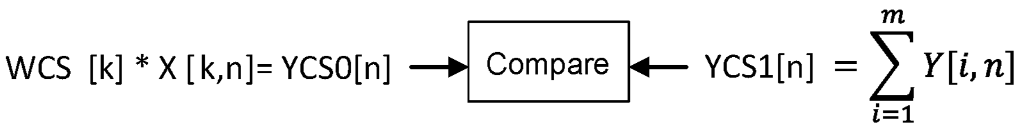
Figure 4E:
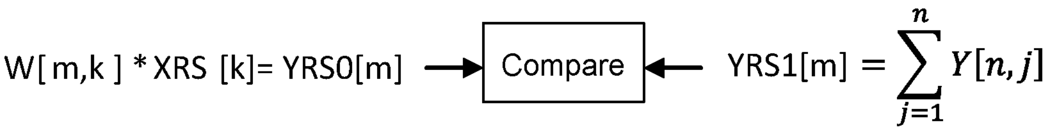
Figure 4F:

FIG. 4B shows an illustrative equation for WCS[k]. FIG. 4C shows an illustrative equation for XRS[k]. Mathematically, a property where WCS*X=YCS and W*XRS=YRS may be utilized for checksum-based fault detection. For example, circuitry that verifies the noted property may be utilized to provide checksum-based redundancy and fault tolerance with reduced overhead. In some examples, as shown in FIG. 4A, WCS may be appended with the matrix W to form a (m+1)×k matrix and similarly XRS may be appended to the matrix X to form a k×(n+1) matrix. These two matrices W, X when multiplied produce a result matrix equivalent to the matrix Y appended with YCS and YRS. An independently computed column and row checksum of the output matrix Y may be compared to the computed YCS and YRS values to detect and correct errors in the matrix multiplication of W and X. FIGS. 4D to 4F show illustrative equations for independently computed checksums and comparisons of results that indicate a detected fault when the comparison fails (e.g., when YCS0[i] does not equal YCS1[i], for any value of i; when YRS0[j] does not equal YRS1[j], for any value of j, or when C0 does not equal C1).

Figure 5:
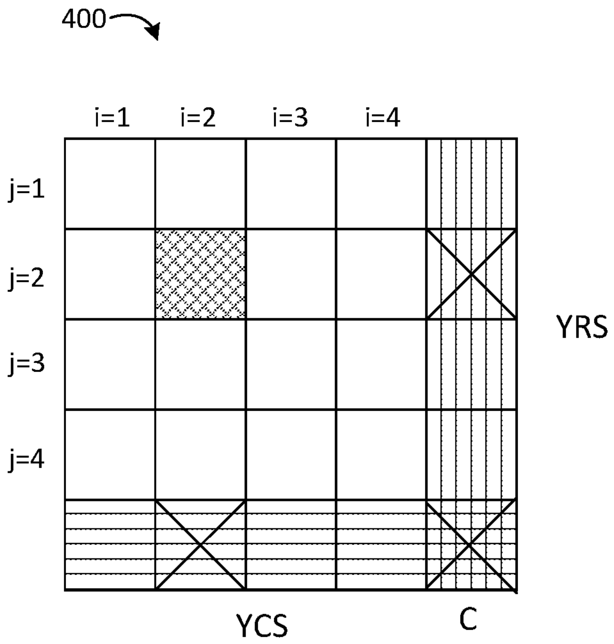
FIG. 5 is an illustrative diagram of an example of an output matrix in one implementation.

FIG. 5 shows an example four by four (4×4) output matrix 400. An initial comparison of C0 and C1 may indicate the presence of a fault happening on the output matrix 400. A further check may show that comparisons of both YRS[i] and YCS[j] failed (e.g., in this example i=j=2). If all other column vectors of YCS and all other row vectors of YRS are correct, the fault may be readily located. Because the failed comparisons of YRS[i] and YCS[j] coincides at Y[i,j], a value of Y[i,j] may get corrupted and the output position Y[i,j] may be determined as a location of a faulty multiplier. Transient or permanent fault errors during matrix multiplication may be detected and located with the checksum results. In this example, where a single multiplier is determined to be faulty, the error may be corrected by subtracting the remaining row values from the correct row checksum, and/or subtracting the remaining column values from the correct column checksum. In some examples, the error may be corrected by recomputing the specific row/column compute using a different hardware vector compute engine.

Figure 6:
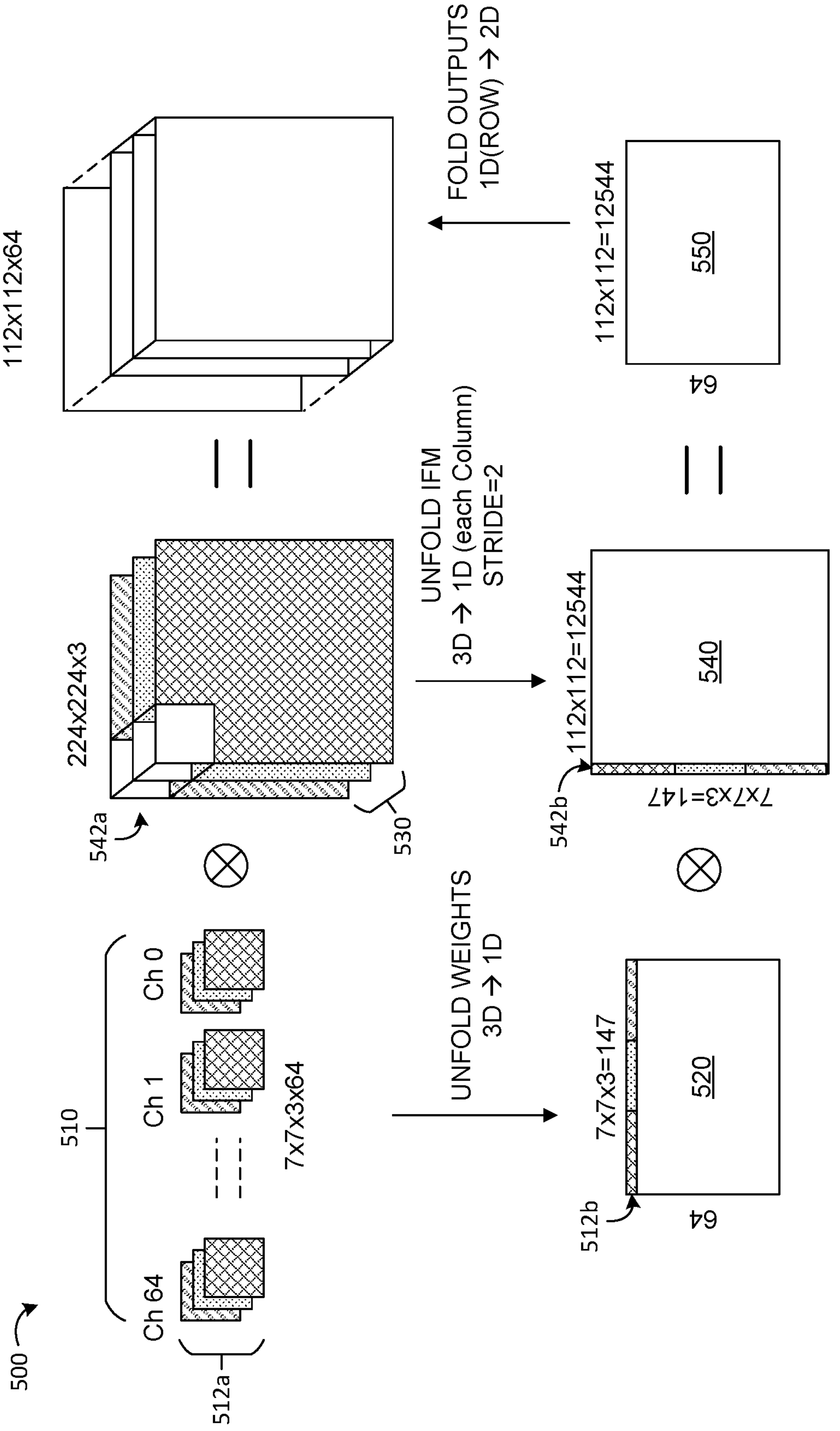
FIG. 6 is a block diagram of another example of an apparatus in one implementation.

FIG. 6 shows an example of an apparatus 500 configured to convert CNN convolutions to matrix multiplications. 3D convolutions may be mapped as matrix multiplication operations by flattening and rearranging the weights and input features. As illustrated in FIG. 6, 64×3 kernels 510 with a size of 7×7 are mapped to a rearranged matrix 520 with dimensions of 64×(3×7×7). All three kernels 512*a* belonging to the same group are flattened horizontally to form a row 512*b* of the weight matrix. Meanwhile, all three input features 530 with dimensions of 224×224 are mapped to a rearranged feature matrix 540 with dimensions of (7×7×3)×(224×224). All the pixels 542*a* covered by the first convolution window in each channel are flattened vertically to form the first column 542*b* of the feature matrix 540. The entire feature matrix 540 can be generated by sliding the convolution window across the features along the column and row directions. After rearrangement, the convolutions are transformed to a general matrix multiplication. The result of the matrix multiplication is an output matrix 550 with dimensions of 64×(112×112), which is the flattened format of the output features.

Systolic arrays may be utilized in an inference engine (e.g., such as graphics processor units (GPUs), tensor processor units (TPUs), etc.). A systolic array may have high data reuse and provide high performance per watt. For example, in a 128×128 systolic array, data is reused 128 times horizontally and 128 times vertically. Given that power consumed for data movement is significantly higher than compute and data reuse helps to reduce the data movement from memory to compute engine, systolic array implementations may be beneficial for a wide variety of computer applications. Some embodiments may provide technology for fault detection logic for a systolic array implementation of matrix multiplication that enables error detection, including a location of the error.

Figure 7:
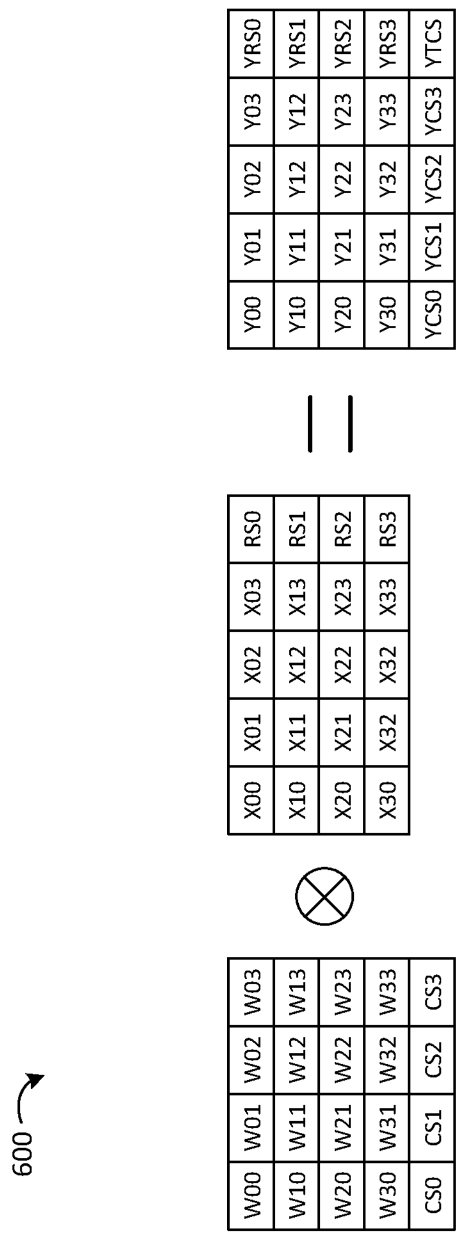
FIG. 7 is a block diagram of an example of a systolic array in one implementation.

FIG. 7 shows an example of matrix multiplication of a systolic array 600 with two example 4×4 matrices W and X. The matrix W is expanded with an additional row for a column sum (CS) of the four columns of the matrix W. For example, CS0=W00+W10+W20+W30, CS1=W01+W11+W21+W31, and so on. The matrix X is expanded with an additional column for a row sum (RS) of the four rows of the matrix X. For example, RS0=X00+X01+X02+X03, RS1=X10+X11+X12+X13, and so on. The matrix Y is a product of the matrix W multiplied to the matrix X (Y=W*X). Although the example shown in FIG. 7 is for a 4×4 matrix, other implementations may be scaled to larger sizes (e.g., 128×128, 256×256, etc.).

Figure 8:
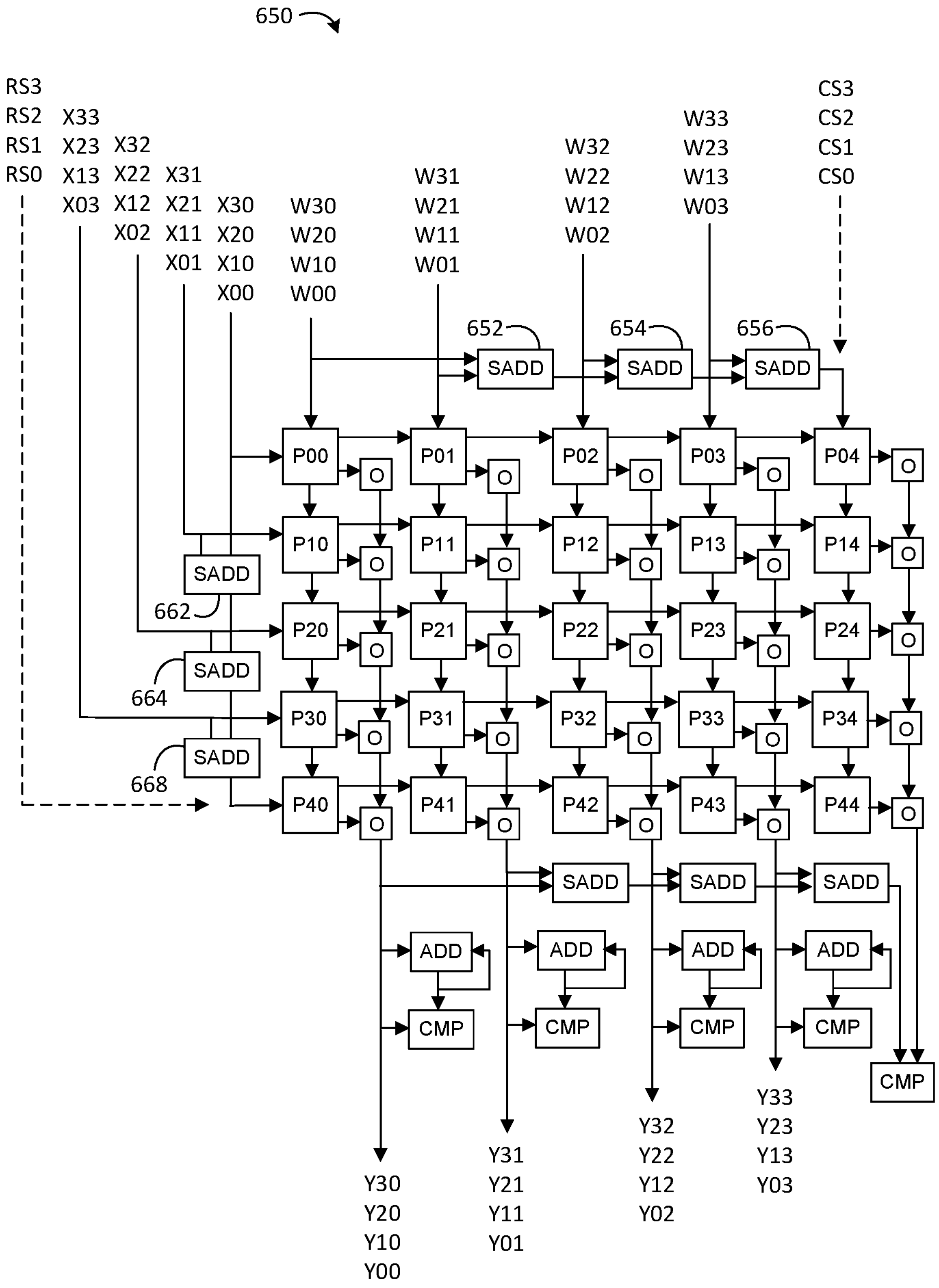
FIG. 8 is a block diagram of an example of a circuit in one implementation.

FIG. 8 shows an example of a circuit 650 configured to perform a matrix multiplication in parallel with a checksum operation on a systolic array to provide checksum-based fault tolerance. As shown in FIG. 8, the circuit 650 implements a two-dimensional (2D) systolic array that includes a set of interconnected processing elements (PEs) P00 through P44, serial adders (SADDs), output daisy chain circuits (O), accumulator adders (ADDs), and comparators (CMP), coupled as shown. Each PE is configured to performing multiply and accumulate (MAC) operations. Data flows directly between the PEs in a pipelined fashion. Input and output communications with storage (e.g., SRAM memory) occurs only at the boundary cells. The matrix X inputs (X00 through X33) are fed from the left, the matrix W inputs (W00 through W33) are fed from the top, and the matrix Y outputs (Y00 through Y33) are collected from the bottom.

The systolic array (SA) includes the PEs P00 through P33. The SADDs 652, 654, and 656 are connected in a daisy chain on the top of the SA to compute a column checksum the for W inputs (e.g., the WCS vector). The SADDs 662, 664, and 668 are connected in a daisy chain fashion on the left of the SA to compute a row checksum for the X inputs (e.g., the XRS vector). The SADDs for the Y outputs in the bottom of the SA are connected in a daisy chain fashion to compute an output column checksum (e.g., the YCS vector). The ADDs for the Y outputs at the bottom of the SA are configured to compute an output row checksum (e.g., the YRS vector). The bottom row multipliers (P40, P41, P42, and P43) compute W*XRS to produce an output YRS1. The rightmost column multipliers (P04, P14, P24, and P34) compute RCS*X to produce an output YCS1.

An example sequence of operation is as follows. An input feature map (IFM) matrix(X) is driven from the left and a weight matrix (W) is driven from the top in a diagonal time shifted manner as shown in FIG. 8. P00 gets data at time T1, P10 and P01 get data only at time T2, and so on such that the compute grows diagonally. The diagonal sequence of operation helps to pipeline and sequence data horizontally and vertically such that parallel connections to all PEs is not needed. Any specific PE is only connected to its neighbors to help in backend timing and routing.

The last row of the array (P40, P41, P42, and P43) gets the sum of the rows of the input matrix X due to the SADDs 662, 664, and 668 placed at the X input in daisy chain fashion. The systolic array works in an output stationary mode. Each PE accumulates one cell of the output matrix Y. Y00 is computed by P00, Y01 by P01 and so on. The last row PEs of the systolic array (P40, P41, P42, and P43) computes the row checksum for the X input and similarly the last column of PEs (P04, P14, P24, and P34) computes the column checksum. P44 computes an overall checksum (C0). The output matrix Y needs to have both a row checksum and a column checksum. The SADDs on the bottom perform row addition (YRS) and the accumulator adders (ADDs) compute the column additions (YCS). The CMPs compare the various checksums and any discrepancy is signaled to a fault handler circuit.

The matrix multiplication and the checksum operations happen in parallel and there are no idle cycles. Because the active PEs in the array grow diagonally, some PEs are idle at the beginning (head) and end (tail) of a matrix computation. To avoid this, some embodiments may overlap a tail of one matrix with a head of subsequent matrix. As compared to full hardware redundancy-based techniques, some embodiments may utilize substantially less circuit area and consume substantially less power.

Figure 9:
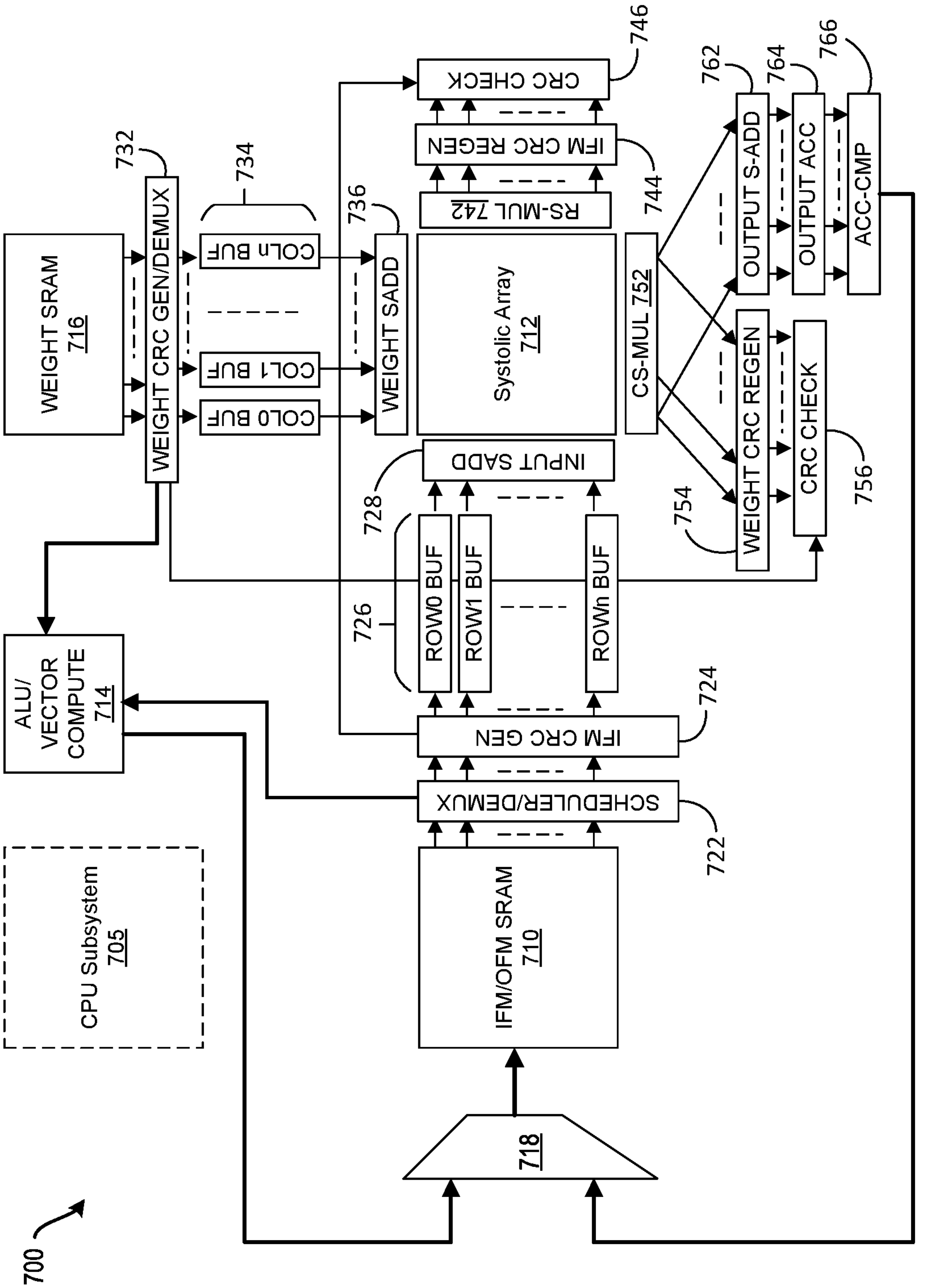
FIG. 9 is a block diagram of an example of a system in one implementation.

FIG. 9 shows an example of a system 700 that includes a matrix compute engine with fault tolerance. For example, the system 700 may be implemented as a SoC for CNN compute with functional safety. The system 700 includes a CPU subsystem 705 to coordinate data movement. Dedicated SRAM 710 stores input feature maps (IFMs) and output feature maps (OFM). The system 700 further includes a systolic array 712, an arithmetic logic unit (ALU)/vector compute module 714, weight SRAM 716, a multiplexer (MUX) 718, a scheduler/demux 722, an IFM cyclic redundancy check (CRC) generator 724, row buffers 726, an input SADD 728, a weight CRC gen/demux 732, column buffers 734, a weight SADD 736, a row sum (RS-MUL) 742, an IFM CRC regeneration 744, a CRC check 746, a column sum (CS-MUL) 752, a weight CRC regeneration 754, a CRC check 756, an output SADD 762, an output accumulator (ACC) 764, and an ACC-CMP 766, coupled as shown.

An example sequence of operation is as follows. An IFM is read from the SRAM 710, with an overlap of data between subsequent IFMs. Data may potentially be reused between multiple rows of the systolic array 712. The scheduler 722 replicates data in different rows and ensures that same data is read from the SRAM 710 only once. There is a combined CRC generated by the IFM CRC generator 724 for the data input for all rows. The result of the CRC compute is passed to the CRC check 746 on the right side of the systolic array 712. The row buffers 726 keep data in a diagonal format. Data is fed to the systolic array 712 in a diagonal manner such that row0 is fed at time T0, row1 at time T1, and so on. Weight data is read from the weight SRAM 716. There is also a CRC generation for weight data by the weight CRC gen/demux 732 and a CRC check 756 at the bottom of the systolic array 712. CRC generation and check on IFM and weight data ensure that the data integrity is intact and any fault on data movement is also detected.

The systolic array 712 is configured to perform matrix multiplications, checksum multiplications, input and output checksum additions, as described herein. For any detected fault, the ACC-CMP 766 generates metadata corresponding to the specific row and column information. The metadata information is written back to the IFM/OFM SRAM 710 along with OFM data. The CPU subsystem 705 may include software to use the vector engine to use the metadata to correct the error either by subtracting from the checksum or by recalculating only the specific wrong multiplier data.

Some embodiments provide checksum-based fault tolerance for matrix compute. Advantageously, some embodiments may significantly lower the overhead as compared to a redundant compute approach. Because the matrix compute and checksum are performed in parallel with exclusive compute hardware, data is reused and latency is not impacted. Some embodiments may advantageously provide substantial saving on silicon area, power, cost and space consumption because there is no redundant compute needed. Some embodiments may further pinpoint a faulty element and support a fast correction or reliability correction techniques (e.g., which is not possible with pure redundancy approach). Some embodiments may provide an improved inference engine for automotive and industrial solutions where functional safety, power and performance are critical requirements.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable. Some examples may be particularly beneficial for parallel computing applications, a GPU (e.g., as part of a discrete graphics card), a SIMD processor, an AI processor, ML applications, and neural network processing applications. Some examples may provide technology for safety critical applications such as industrial computing and/or automotive specific applications including AD, ADAS, rendering, and/or sensor/image processing.

Figure 10:
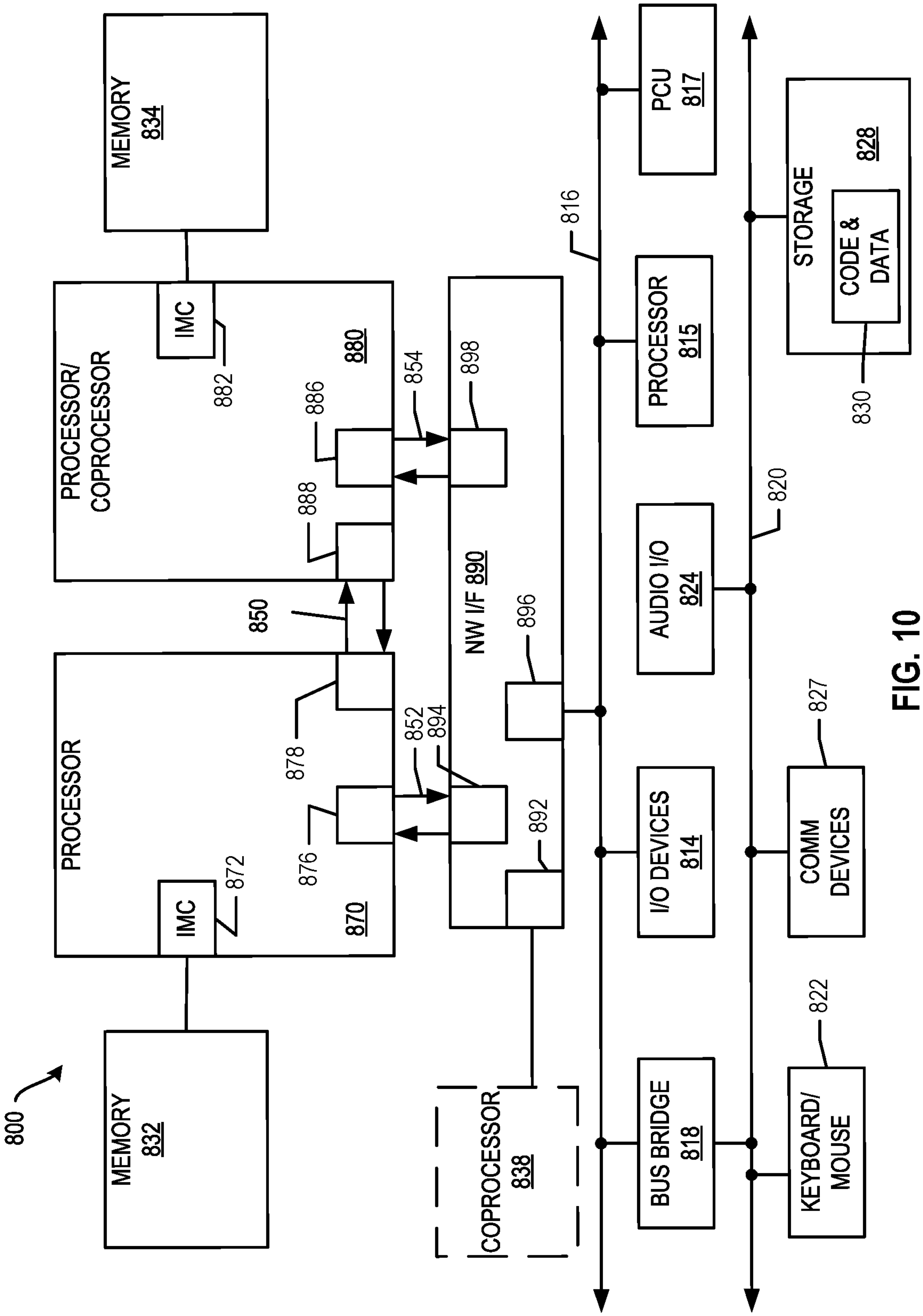
FIG. 10 illustrates an example computing system.

FIG. 10 illustrates an example computing system. Multiprocessor system 800 is an interfaced system and includes a plurality of processors or cores including a first processor 870 and a second processor 880 coupled via an interface 850 such as a point-to-point (P-P) interconnect, a fabric, and/or bus. In some examples, the first processor 870 and the second processor 880 are homogeneous. In some examples, first processor 870 and the second processor 880 are heterogenous. Though the example system 800 is shown to have two processors, the system may have three or more processors, or may be a single processor system. In some examples, the computing system is a system on a chip (SoC).

Processors 870 and 880 are shown including integrated memory controller (IMC) circuitry 872 and 882, respectively. Processor 870 also includes interface circuits 876 and 878; similarly, second processor 880 includes interface circuits 886 and 888. Processors 870, 880 may exchange information via the interface 850 using interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a network interface (NW I/F) 890 via individual interfaces 852, 854 using interface circuits 876, 894, 886, 898. The network interface 890 (e.g., one or more of an interconnect, bus, and/or fabric, and in some examples is a chipset) may optionally exchange information with a coprocessor 838 via an interface circuit 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via an interface such as P-P interconnect, such that either or both processors' local cache information may be stored in the shared cache if a processor is placed into a low power mode.

Network interface 890 may be coupled to a first interface 816 via interface circuit 896. In some examples, first interface 816 may be an interface such as a Peripheral Component Interconnect (PCI) interconnect, a PCI Express interconnect or another I/O interconnect. In some examples, first interface 816 is coupled to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interface 816, along with a bus bridge 818 which couples first interface 816 to a second interface 820. In some examples, one or more additional processor(s) 815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 816. In some examples, second interface 820 may be a low pin count (LPC) interface. Various devices may be coupled to second interface 820 including, for example, a keyboard and/or mouse 822, communication devices 827 and storage circuitry 828. Storage circuitry 828 may be one or more non-transitory machine-readable storage media as described below, such as a disk drive or other mass storage device which may include instructions/code and data 830. Further, an audio I/O 824 may be coupled to second interface 820. Note that other architectures than the point-to-point architecture described above are possible. For example, instead of the point-to-point architecture, a system such as multiprocessor system 800 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 11:
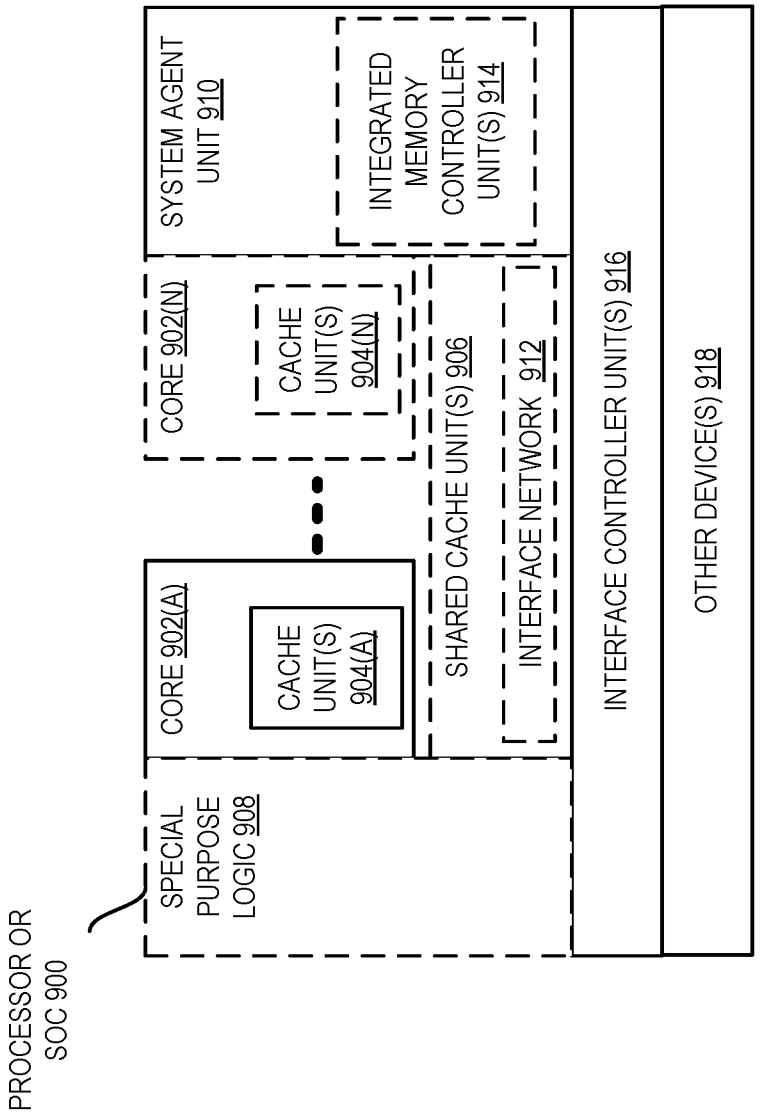
FIG. 11 illustrates a block diagram of an example processor and/or System on a Chip (SoC) that may have one or more cores and an integrated memory controller.

FIG. 11 illustrates a block diagram of an example processor and/or SoC 900 that may have one or more cores and an integrated memory controller. The solid lined boxes illustrate a processor 900 with a single core 902(A), system agent unit circuitry 910, and a set of one or more interface controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interface controller units circuitry 916. Note that the processor 900 may be one of the processors 870 or 880, or co-processor 838 or 815 of FIG. 10.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples interface network circuitry 912 (e.g., a ring interconnect) interfaces the special purpose logic 908 (e.g., integrated graphics logic), the set of shared cache unit(s) circuitry 906, and the system agent unit circuitry 910, alternative examples use any number of well-known techniques for interfacing such units. In some examples, coherency is maintained between one or more of the shared cache unit(s) circuitry 906 and cores 902(A)-(N). In some examples, interface controller units circuitry 916 couple the cores 902 to one or more other devices 918 such as one or more I/O devices, storage, one or more communication devices (e.g., wireless networking, wired networking, etc.), etc.

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA.

Example Core Architectures—In-order and out-of-order core block diagram.

Figure 12A:
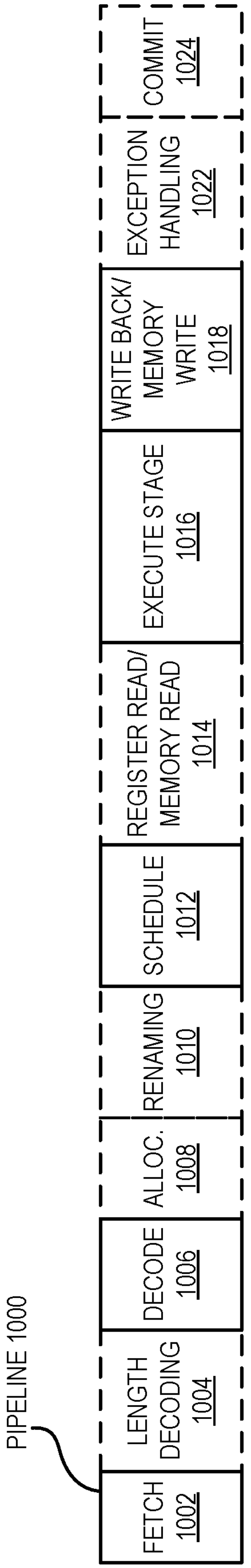
FIG. 12A is a block diagram illustrating both an example in-order pipeline and an example register renaming, out-of-order issue/execution pipeline according to examples.
Figure 12B:
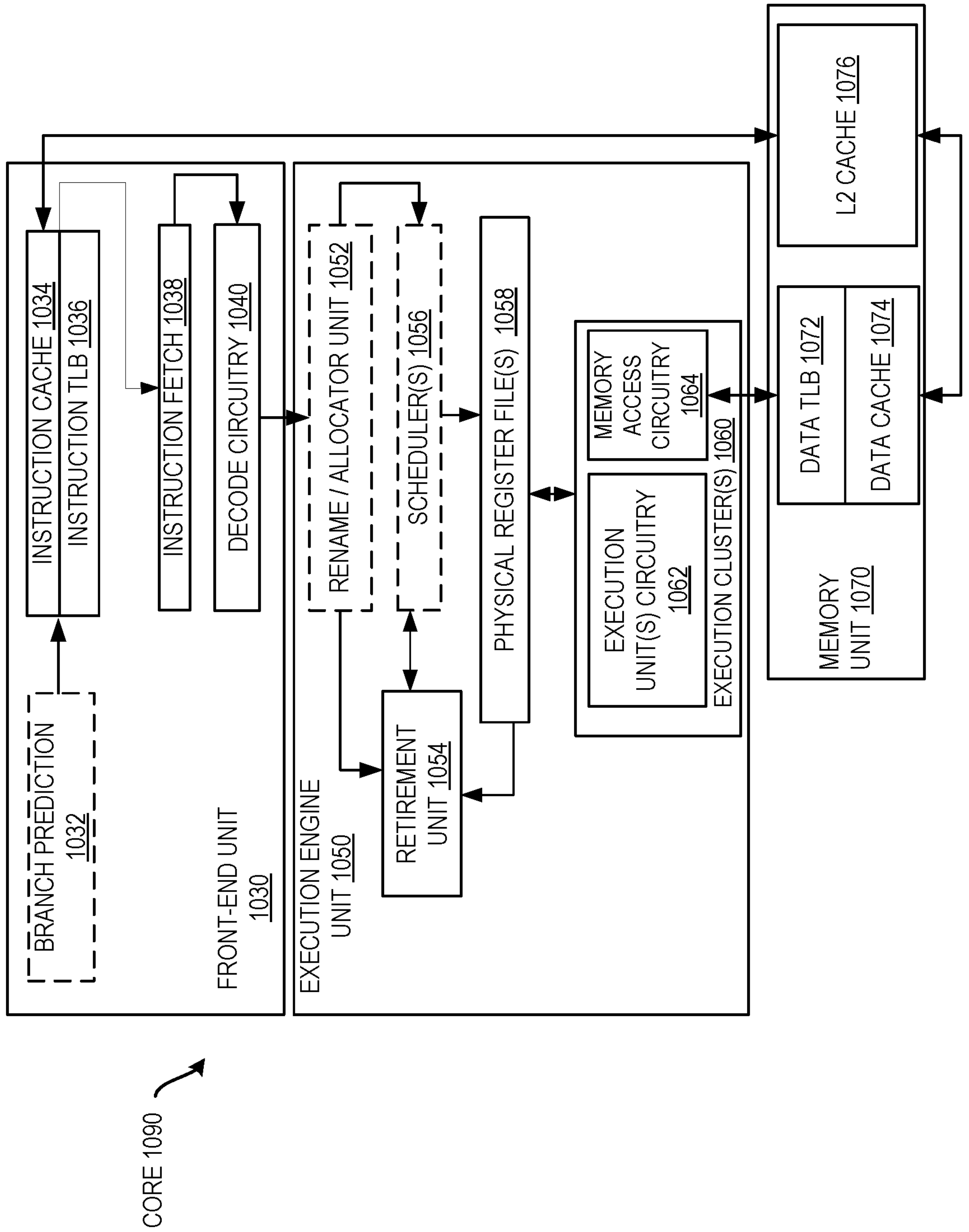
FIG. 12B is a block diagram illustrating both an example in-order architecture core and an example register renaming, out-of-order issue/execution architecture core to be included in a processor according to examples.

FIG. 12A is a block diagram illustrating both an example in-order pipeline and an example register renaming, out-of-order issue/execution pipeline according to examples. FIG. 12B is a block diagram illustrating both an example in-order architecture core and an example register renaming, out-of-order issue/execution architecture core to be included in a processor according to examples. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 12B may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 12B shows a processor core 1090 including front-end unit circuitry 1030 coupled to execution engine unit circuitry 1050, and both are coupled to memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit circuitry 1030 may include branch prediction circuitry 1032 coupled to instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, microcode entry points, microinstructions, other instructions, or other control signals, which are decoded from, or which otherwise reflect, or are derived from, the original instructions. The decode circuitry 1040 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front-end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, address generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to data cache circuitry 1074 coupled to level 2 (L2) cache circuitry 1076. In one example, the memory access circuitry 1064 may include load unit circuitry, store address unit circuitry, and store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data.

Example Execution Unit(s) Circuitry.

Figure 13:
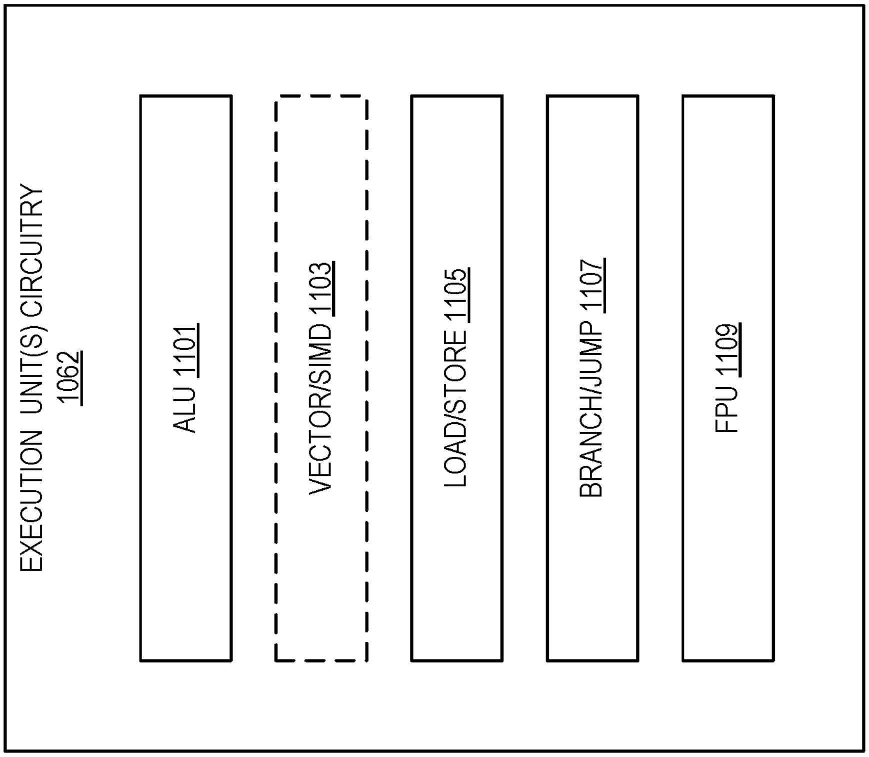
FIG. 13 illustrates examples of execution unit(s) circuitry.

FIG. 13 illustrates examples of execution unit(s) circuitry, such as execution unit(s) circuitry 1062 of FIG. 12B. As illustrated, execution unit(s) circuitry 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 14:
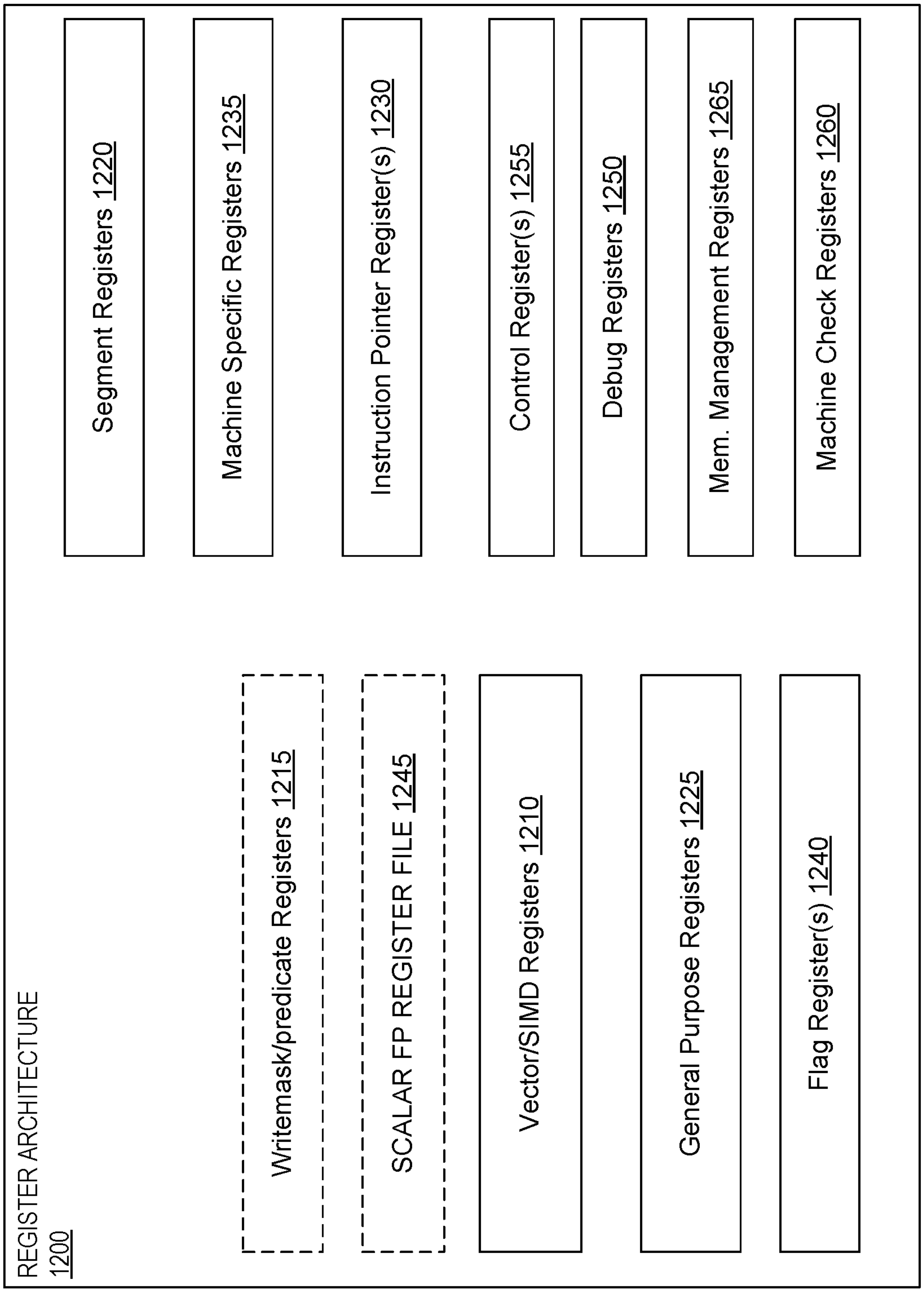
FIG. 14 is a block diagram of a register architecture according to some examples.

FIG. 14 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register file 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1200 may, for example, be used in register file/memory, or physical register file(s) circuitry 1058.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 15 shows a program in a high-level language 1302 may be compiled using a first ISA compiler 1304 to generate first ISA binary code 1306 that may be natively executed by a processor with at least one first ISA core 1316. The processor with at least one first ISA core 1316 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1304 represents a compiler that is operable to generate first ISA binary code 1306 (e.g., object code) that can, with or without additional linkage processing, be executed on the processor with at least one first ISA core 1316. Similarly, FIG. 15 shows the program in the high-level language 1302 may be compiled using an alternative ISA compiler 1308 to generate alternative ISA binary code 1310 that may be natively executed by a processor without a first ISA core 1314. The instruction converter 1312 is used to convert the first ISA binary code 1306 into code that may be natively executed by the processor without a first ISA core 1314. This converted code is not necessarily to be the same as the alternative ISA binary code 1310; however, the converted code will accomplish the general operation and be made up of instructions from the alternative ISA. Thus, the instruction converter 1312 represents software, firmware, hardware, or a combination thereof that, through emulation, simulation or any other process, allows a processor or other electronic device that does not have a first ISA processor or core to execute the first ISA binary code 1306.

Techniques and architectures for checksum-based fault detection and correction for matrix operations are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description

ADDITIONAL NOTES AND EXAMPLES

Example 1 includes an apparatus, comprising matrix operation hardware circuitry, and circuitry coupled to the matrix operation hardware circuitry to detect a hardware fault in the matrix operation hardware circuitry based at least in part on one or more hardware checksums of data in one or more matrices of the matrix operation hardware circuitry.

Example 2 includes the apparatus of Example 1, wherein the circuitry is further to correct the detected hardware fault based at least in part on the one or more hardware checksums.

Example 3 includes the apparatus of Example 2, wherein the circuitry is further to continue a safety critical operation without interruption after the hardware fault is detected and corrected.

Example 4 includes the apparatus of any of Examples 1 to 3, wherein the circuitry is further to determine a location of a detected hardware fault in a matrix of the one or more matrices of the matrix operation hardware circuitry based at least in part on the one or more hardware checksums.

Example 5 includes the apparatus of Example 4, wherein the circuitry is further to generate metadata that indicates the determined location of the detected hardware fault.

Example 6 includes the apparatus of Example 5, wherein the circuitry is further to correct the detected hardware fault based at least in part on the generated metadata and the one or more hardware checksums.

Example 7 includes the apparatus of Example 6, wherein the circuitry is further to continue a safety critical operation without interruption after the hardware fault is detected and corrected.

Example 8 includes the apparatus of any of Examples 1 to 7, wherein the circuitry is further to compute a checksum in parallel with a matrix multiplication operation of the matrix operation hardware circuitry.

Example 9 includes the apparatus of Example 8, wherein the circuitry is further to perform a checksum computation and a matrix multiplication on a same operand at a same data location in a matrix of the one or more matrices of the matrix operation hardware circuitry.

Example 10 includes the apparatus of any of Examples 1 to 9, wherein the circuitry is further to compute two input checksums, a checksum multiplication of the two input checksums, and an output checksum in parallel with a matrix multiplication operation of the matrix operation hardware circuitry.

Example 11 includes the apparatus of Example 10, wherein the circuitry is further to detect the hardware fault in the matrix operation hardware circuitry based at least in part on a comparison of respective results of the checksum multiplication and the output checksum.

Example 12 includes an apparatus, comprising circuitry to store a machine representation of data for a matrix W with dimensions of m by k, where m and k are both positive integer values, store a machine representation of data for a matrix X with dimensions of k by n, where n is a positive integer value, store a machine representation of data for a matrix Y with dimensions of m by n, perform a matrix operation on the matrix W and the matrix X and to store a result of the matrix operation in the matrix Y, perform one or more checksum operations on one or more of the matrix W, the matrix X, and the matrix Y, and detect a hardware fault in the circuitry based at least in part on a result of the one or more checksum operations.

Example 13 includes the apparatus of Example 12, wherein the circuitry is further to perform a column-wise checksum of the data for the matrix W, perform a row-wise checksum of the data for the matrix X, perform a column-wise checksum of the data for the matrix Y, and perform a row-wise checksum of the data for the matrix Y.

Example 14 includes the apparatus of Example 13, wherein the circuitry is further to detect the hardware fault based at least in part on whether a product of the column-wise checksum of the data for the matrix W and a data value in the matrix X is equal to a corresponding value of the column-wise checksum of the data for the matrix Y.

Example 15 includes the apparatus of any of Examples 13 to 14, wherein the circuitry is further to detect the hardware fault based at least in part on whether a product of the row-wise checksum of the data for the matrix X and a data value in the matrix W is equal to a corresponding value of the row-wise checksum of the data for the matrix Y.

Example 16 includes the apparatus of any of Examples 13 to 15, wherein the circuitry is further to detect the hardware fault based at least in part on whether a product of the column-wise checksum of the data for the matrix W and the row-wise checksum of the data for the matrix X is equal to a sum of the row-wise checksum and the column-wise checksum of the data for the matrix Y.

Example 17 includes the apparatus of any of Examples 13 to 16, wherein the circuitry is further to determine a location of a fault in the matrix Y based on respective positions of failed comparisons for the row-wise checksum and the column-wise checksum of the data for the matrix Y.

Example 18 includes the apparatus of any of Examples 12 to 17, wherein the circuitry is further to re-use a same data location in the matrix W for both the matrix operation and the column-wise checksum operation for the matrix W. Example 19 includes the apparatus of any of Examples 12 to 18, wherein the circuitry is further to re-use a same data location in the matrix X for both the matrix operation and the row-wise checksum operation for the matrix X. Example 20 includes an apparatus, comprising a processor, and a matrix compute engine communicatively coupled to the processor, the matrix compute engine comprising circuitry to perform a matrix operation on a first input matrix and a second input matrix and store respective results of the matrix operation in an output matrix, perform respective checksum operations on one or more row and columns of the first input matrix, the second input matrix, and the output matrix, and detect a hardware fault in the matrix compute engine based at least in part on respective results of the respective checksum operations.

Example 21 includes the apparatus of Example 20, wherein the circuitry is further to flatten and rearrange weights and input features of a three-dimensional convolution to map the three-dimensional convolution to multiple matrix multiplication operations.

Example 22 includes the apparatus of any of Examples 20 to 21, wherein the circuitry is further to correct the detected hardware fault based at least in part on respective comparisons of the respective results of the respective checksum operations.

Example 23 includes the apparatus of Example 22, wherein the circuitry is further to continue a safety critical operation without interruption after the hardware fault is detected and corrected.

Example 24 includes the apparatus of any of Examples 20 to 23, wherein the circuitry is further to determine a location of a detected hardware fault in one or more of the first input matrix, the second input matrix, and the output matrix based at least in part on respective comparisons of the respective results of the respective checksum operations.

Example 25 includes the apparatus of any of Examples 20 to 24, wherein the circuitry is further to perform one or more of the respective checksum operations in parallel with the matrix operation.

Example 26 includes the apparatus of any of Examples 20 to 25, wherein the circuitry is further to perform first checksum operations on each column of the first input matrix and store respective results of the first checksum operations in an input checksum row vector, perform second checksum operations on each row the second input matrix and store respective results of the second checksum operations in an input checksum column vector, perform third checksum operations on each column of the output matrix and store respective results of the third checksum operations in an output checksum row vector, and perform fourth checksum operations on each row the output matrix and store respective results of the fourth checksum operations in an output checksum column vector.

Example 27 includes a method, comprising storing a machine representation of data for a matrix W with dimensions of m by k, where m and k are both positive integer values, storing a machine representation of data for a matrix X with dimensions of k by n, where n is a positive integer value, storing a machine representation of data for a matrix Y with dimensions of m by n, performing a matrix operation on the matrix W and the matrix X and to store a result of the matrix operation in the matrix Y, performing one or more checksum operations on one or more of the matrix W, the matrix X, and the matrix Y, and detecting a hardware fault in the circuitry based at least in part on a result of the one or more checksum operations.

Example 28 includes the method of Example 27, further comprising performing a column-wise checksum of the data for the matrix W, performing a row-wise checksum of the data for the matrix X, performing a column-wise checksum of the data for the matrix Y, and performing a row-wise checksum of the data for the matrix Y.

Example 29 includes the method of Example 28, further comprising detecting the hardware fault based at least in part on whether a product of the column-wise checksum of the data for the matrix W and a data value in the matrix X is equal to a corresponding value of the column-wise checksum of the data for the matrix Y.

Example 30 includes the method of any of Examples 28 to 29, further comprising detecting the hardware fault based at least in part on whether a product of the row-wise checksum of the data for the matrix X and a data value in the matrix W is equal to a corresponding value of the row-wise checksum of the data for the matrix Y.

Example 31 includes the method of any of Examples 28 to 30, further comprising detecting the hardware fault based at least in part on whether a product of the column-wise checksum of the data for the matrix W and the row-wise checksum of the data for the matrix X is equal to a sum of the row-wise checksum and the column-wise checksum of the data for the matrix Y.

Example 32 includes the method of any of Examples 28 to 31, further comprising determining a location of a fault in the matrix Y based on respective positions of failed comparisons for the row-wise checksum and the column-wise checksum of the data for the matrix Y.

Example 33 includes the method of any of Examples 27 to 32, further comprising re-using a same data location in the matrix W for both the matrix operation and the column-wise checksum operation for the matrix W. Example 34 includes the method of any of Examples 27 to 33, further comprising re-using a same data location in the matrix X for both the matrix operation and the row-wise checksum operation for the matrix X. Example 35 includes an apparatus, comprising means for storing a machine representation of data for a matrix W with dimensions of m by k, where m and k are both positive integer values, means for storing a machine representation of data for a matrix X with dimensions of k by n, where n is a positive integer value, means for storing a machine representation of data for a matrix Y with dimensions of m by n, means for performing a matrix operation on the matrix W and the matrix X and to store a result of the matrix operation in the matrix Y, means for performing one or more checksum operations on one or more of the matrix W, the matrix X, and the matrix Y, and means for detecting a hardware fault in the circuitry based at least in part on a result of the one or more checksum operations.

Example 36 includes the apparatus of Example 35, further comprising means for performing a column-wise checksum of the data for the matrix W, means for performing a row-wise checksum of the data for the matrix X, means for performing a column-wise checksum of the data for the matrix Y, and means for performing a row-wise checksum of the data for the matrix Y.

Example 37 includes the apparatus of Example 36, further comprising means for detecting the hardware fault based at least in part on whether a product of the column-wise checksum of the data for the matrix W and a data value in the matrix X is equal to a corresponding value of the column-wise checksum of the data for the matrix Y.

Example 38 includes the apparatus of any of Examples 36 to 37, further comprising means for detecting the hardware fault based at least in part on whether a product of the row-wise checksum of the data for the matrix X and a data value in the matrix W is equal to a corresponding value of the row-wise checksum of the data for the matrix Y.

Example 39 includes the apparatus of any of Examples 36 to 38, further comprising means for detecting the hardware fault based at least in part on whether a product of the column-wise checksum of the data for the matrix W and the row-wise checksum of the data for the matrix X is equal to a sum of the row-wise checksum and the column-wise checksum of the data for the matrix Y.

Example 40 includes the apparatus of any of Examples 36 to 39, further comprising means for determining a location of a fault in the matrix Y based on respective positions of failed comparisons for the row-wise checksum and the column-wise checksum of the data for the matrix Y.

Example 41 includes the apparatus of any of Examples 35 to 40, further comprising means for re-using a same data location in the matrix W for both the matrix operation and the column-wise checksum operation for the matrix W. Example 42 includes the apparatus of any of Examples 35 to 41, further comprising means for re-using a same data location in the matrix X for both the matrix operation and the row-wise checksum operation for the matrix X. Example 43 includes at least one non-transitory one machine readable medium comprising a plurality of instructions that, in response to being executed on a computing device, cause the computing device to store a machine representation of data for a matrix W with dimensions of m by k, where m and k are both positive integer values, store a machine representation of data for a matrix X with dimensions of k by n, where n is a positive integer value, store a machine representation of data for a matrix Y with dimensions of m by n, perform a matrix operation on the matrix W and the matrix X and to store a result of the matrix operation in the matrix Y, perform one or more checksum operations on one or more of the matrix W, the matrix X, and the matrix Y, and detect a hardware fault in the circuitry based at least in part on a result of the one or more checksum operations.

Example 44 includes the at least one non-transitory one machine readable medium of Example 43, comprising a plurality of further instructions that, in response to being executed on the computing device, cause the computing device to perform a column-wise checksum of the data for the matrix W, perform a row-wise checksum of the data for the matrix X, perform a column-wise checksum of the data for the matrix Y, and perform a row-wise checksum of the data for the matrix Y.

Example 45 includes the at least one non-transitory one machine readable medium of Example 44, comprising a plurality of further instructions that, in response to being executed on the computing device, cause the computing device to detect the hardware fault based at least in part on whether a product of the column-wise checksum of the data for the matrix W and a data value in the matrix X is equal to a corresponding value of the column-wise checksum of the data for the matrix Y.

Example 46 includes the at least one non-transitory one machine readable medium of any of Examples 44 to 45, comprising a plurality of further instructions that, in response to being executed on the computing device, cause the computing device to detect the hardware fault based at least in part on whether a product of the row-wise checksum of the data for the matrix X and a data value in the matrix W is equal to a corresponding value of the row-wise checksum of the data for the matrix Y.

Example 47 includes the at least one non-transitory one machine readable medium of any of Examples 44 to 46, comprising a plurality of further instructions that, in response to being executed on the computing device, cause the computing device to detect the hardware fault based at least in part on whether a product of the column-wise checksum of the data for the matrix W and the row-wise checksum of the data for the matrix X is equal to a sum of the row-wise checksum and the column-wise checksum of the data for the matrix Y.

Example 48 includes the at least one non-transitory one machine readable medium of any of Examples 44 to 47, comprising a plurality of further instructions that, in response to being executed on the computing device, cause the computing device to determine a location of a fault in the matrix Y based on respective positions of failed comparisons for the row-wise checksum and the column-wise checksum of the data for the matrix Y.

Example 49 includes the at least one non-transitory one machine readable medium of any of Examples 43 to 48, comprising a plurality of further instructions that, in response to being executed on the computing device, cause the computing device to re-use a same data location in the matrix W for both the matrix operation and the column-wise checksum operation for the matrix W.

Example 50 includes the at least one non-transitory one machine readable medium of any of Examples 43 to 49, comprising a plurality of further instructions that, in response to being executed on the computing device, cause the computing device to re-use a same data location in the matrix X for both the matrix operation and the row-wise checksum operation for the matrix X.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus, comprising:

a systolic array comprising:

a first row of first processing element (PE) circuits which are each coupled to receive a different respective column of a first matrix, and a first column of second PE circuits which are each coupled to receive a different respective column of a second matrix, wherein the systolic array is to perform multiply-and-accumulate (MAC) operations to generate a third matrix which corresponds to a product of the first matrix and the second matrix;

first adder circuits each coupled to receive a different respective column of the first matrix while the first PE circuits each receive a different respective column of the first matrix, wherein the first adder circuits are to generate during the MAC operations a first column checksum vector based on the first matrix, wherein a second column of the systolic array is coupled to receive the first column checksum vector from the first adder circuits during the MAC operations, and wherein the MAC operations are further to generate a second column checksum vector based on the second matrix and the first column checksum vector;

second adder circuits each coupled to receive a different respective column of the second matrix while the second PE circuits each receive a different respective column of the second matrix, wherein the second adder circuits are to generate during the MAC operations a first row checksum vector based on the second matrix, wherein a second row of the systolic array is coupled to receive the first row checksum vector from the second adder circuits during the MAC operations, and wherein the MAC operations are further to generate a second row checksum vector based on the first matrix and the first row checksum vector; and fault detection circuitry coupled to receive from the systolic array each of the third matrix, the second column checksum vector, and the second row checksum vector, the fault detection circuitry to:

calculate a third column checksum vector comprising first column checksum values which are each based on a different respective column of the third matrix;

calculate a third row checksum vector comprising second row checksum values which are each based on a different respective row of the third matrix; and detect a hardware fault in the systolic array based on the second column checksum vector, the second row checksum vector, the third column checksum vector, and the third row checksum vector;

wherein the systolic array is to perform a checksum computation and a matrix multiplication each with a same PE circuit of the systolic array.

2. The apparatus of claim 1, wherein the fault detection circuitry is further to correct the detected hardware fault.

3. The apparatus of claim 1, wherein the fault detection circuitry is further to:

determine a location of a detected hardware fault in the systolic array based at least in part on the second column checksum vector, the second row checksum vector, the third column checksum vector, and the third row checksum vector.

4. The apparatus of claim 3, wherein the fault detection circuitry is further to:

generate metadata that indicates the determined location of the detected hardware fault.

5. The apparatus of claim 4, wherein the fault detection circuitry is further to:

correct the detected hardware fault based at least in part on the generated metadata and the second column checksum vector, the second row checksum vector, the third column checksum vector, and the third row checksum vector.

6. An apparatus, comprising circuitry to:

a first memory to store a machine representation of data for a matrix W with dimensions of m by k, where m and k are both positive integer values;

a second memory to store a machine representation of data for a matrix X with dimensions of k by n, where n is a positive integer value;

a systolic array coupled to the first memory and the second memory, the systolic array comprising:

a first row of first processing element (PE) circuits which are each coupled to receive a different respective column of a matrix W, and a first column of second PE circuits which are each coupled to receive a different respective column of a matrix X, wherein the systolic array is to perform multiply-and-accumulate (MAC) operations to generate a matrix Y with dimensions of m by n, wherein the matrix Y corresponds to a product of the matrix W and the matrix X;

first adder circuits each coupled to receive from the first memory a different respective column of the matrix W while the first PE circuits each receive from the first memory a different respective column of the matrix W, wherein the first adder circuits are to generate during the MAC operations a first column checksum vector based on the matrix W, wherein a second column of the systolic array is coupled to receive the first column checksum vector from the first adder circuits during the MAC operations, and wherein the MAC operations are further to generate a second column checksum vector based on the matrix X and the first column checksum vector;

second adder circuits each coupled to receive from the second memory a different respective column of the matrix X while the second PE circuits each receive from the second memory a different respective column of the matrix X, wherein the second adder circuits are to generate during the MAC operations a first row checksum vector based on the matrix X, wherein a second row of the systolic array is coupled to receive the first row checksum vector from the second adder circuits during the MAC operations, and wherein the MAC operations are further to generate a second row checksum vector based on the matrix W and the first row checksum vector; and fault detection circuitry coupled to receive from the systolic array each of the matrix Y, the second column checksum vector, and the second row checksum vector, the fault detection circuitry to:

calculate a third column checksum vector based on columns of the matrix Y;

calculate a third row checksum vector based on rows of the matrix Y; and detect a hardware fault in the systolic array based on the second column checksum vector, the second row checksum vector, the third column checksum vector, and the third row checksum vector;

wherein the systolic array is to perform a checksum computation and a matrix multiplication each with a same PE circuit of the systolic array.

7. The apparatus of claim 6, wherein the fault detection circuitry to detect the hardware fault comprises the fault detection circuitry to perform:

a first comparison of the second column checksum vector to the third column checksum vector; and a second comparison of the second row checksum vector to the third row checksum vector.

8. The apparatus of claim 7, wherein:

the fault detection circuitry is to calculate:

first column checksum values of the third column checksum vector each based on a different respective column of the matrix Y; and second row checksum values of the third row checksum vector each based on a different respective row of the matrix Y; and the fault detection circuitry is to detect the hardware fault further based on the third column checksum vector and the third row checksum vector.

9. The apparatus of claim 8, wherein the fault detection circuitry is further to:

determine a location of a fault in the matrix Y based on respective positions of failed comparisons based on the second column checksum vector and the second row checksum vector.

10. An apparatus, comprising:

a processor; and a matrix compute engine communicatively coupled to the processor, the matrix compute engine comprising:

a systolic array comprising:

a first row of first processing element (PE) circuits which are each coupled to receive a different respective column of a first input matrix, and a first column of second PE circuits which are each coupled to receive a different respective column of a second input matrix, wherein the systolic array is to perform multiply-and-accumulate (MAC) operations to generate an output matrix which corresponds to a product of the first input matrix and the second input matrix;

first adder circuits each coupled to receive a different respective column of the first input matrix while the first PE circuits each receive a different respective column of the first input matrix, wherein the first adder circuits are to generate during the MAC operations a first column checksum vector based on the first input matrix, wherein a second column of the systolic array is coupled to receive the first column checksum vector from the first adder circuits during the MAC operations, and wherein the MAC operations are further to generate a second column checksum vector based on the second input matrix and the first column checksum vector;

second adder circuits each coupled to receive a different respective column of the second input matrix while the second PE circuits each receive a different respective column of the second input matrix, wherein the second adder circuits are to generate during the MAC operations a first row checksum vector based on the second input matrix, wherein a second row of the systolic array is coupled to receive the first row checksum vector from the second adder circuits during the MAC operations, and wherein the MAC operations are further to generate a second row checksum vector based on the first input matrix and the first row checksum vector; and fault detection circuitry coupled to receive from the systolic array each of the output matrix, the second column checksum vector, and the second row checksum vector, the fault detection circuitry to detect a hardware fault in the systolic array based on the second column checksum vector and the second row checksum vector;

wherein the systolic array is to perform a checksum computation and a matrix multiplication each with a same PE circuit of the systolic array.

11. The apparatus of claim 10, further comprising circuitry to:

flatten and rearrange weights and input features of a three-dimensional convolution to map the three-dimensional convolution to multiple matrix multiplication operations.

12. The apparatus of claim 10, wherein the fault detection circuitry is further to correct the detected hardware fault.

13. The apparatus of claim 10, wherein the fault detection circuitry is further to:

determine a location of a detected hardware fault in the systolic array based at least in part on respective comparisons of the second column checksum vector and the second row checksum vector.

14. The apparatus of claim 10, wherein the MAC operations are to:

perform a calculation of the first column checksum vector and the first row checksum vector in parallel with a calculation of the output matrix.

* * * * *